Patented Feb. 20, 1923.

1,446,185

UNITED STATES PATENT OFFICE.

CAMILLE HORST, OF WITTELSHEIM, FRANCE.

PROCESS FOR THE PRODUCTION OF POTASSIUM SULPHATE.

No Drawing.   Application filed March 20, 1922.   Serial No. 545,355.

*To all whom it may concern:*

Be it known that I, CAMILLE HORST, a citizen of the French Republic, residing at Wittelsheim, Haut-Rhin, France, have invented new and useful Improved Processes for the Production of Potassium Sulphate, of which the following is a specification.

It is already known that by treating sulphate of calcium with carbonate of sodium there is obtained carbonate of calcium and sulphate of sodium, this reaction being made use of in quantitative analyses (Treadwell pages 393 and 429). By replacing sodic carbonate by potassic carbonate, potassic sulphate is obtained. This latter reaction has not hitherto found industrial application. The manufacture of sulphate of potassium being effected either by commencing with kieserit, or by the reaction of sulphuric acid upon chloride of potassium.

The present inventor has discovered that, by treating calcic sulphate with carbonic acid suspended in an aqueous solution of caustic potassium, a saturated solution of sulphate of potassium is obtained which upon cooling deposits the sulphate produced.

The reaction is as follows:—

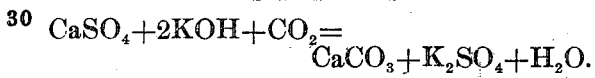

There is formed firstly by the action of the carbonic acid a carbonate of potassium:—

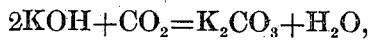

and the second reaction:—

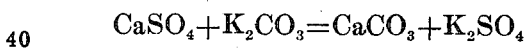

is based upon the difference of solubility between the carbonate and the sulphate of calcium, the carbonate being practically insoluble and the sulphate very little. This reaction is quantitative and the by-product, viz:—the carbonate of calcium, forms a product capable of industrial application.

In order to render this process industrial for the production of sulphate of potassium by treating sulphate of calcium in suspention in an aqueous solution of caustic potash by means of carbonic acid, the inventor has devised a process to utilize gypsum and the dilute solutions of caustic potash obtained by the electrolysis of chloride of potassium, because these caustic solutions obtained from the electrolyzed chloride can directly decompose the gypsum in the liquid.

Carbonate of potassium is formed in these solutions themselves and reacts in the nascent condition. The transformation of the calcic sulphate is effected either in a diluted, concentrated, or even saturated solution of sulphate of potassium at all temperatures. When the solution is saturated with sulphate of potassium, the reaction repeats itself continuously as long as there is any carbonate of potassium and sulphate of calcium in contact, and the sulphate of potassium separates out.

What I claim is:—

1. Improved process for producing sulphate of potassium, which consists in reacting upon sulphate of calcium suspended in an aqueous solution of caustic potash by carbonic acid, thereby producing a saturated solution of sulphate of potassium, and cooling the said solution until the sulphate of potassium produced separates out.

2. In the process claimed in claim 1, producing caustic potash solution by electrolysis of potassium chloride solution, removing the nascent chlorine, then treating sulphate of calcium suspended in the caustic potash solution with carbonic acid, and finally separating the carbonate of calcium from the solution of potassium sulphate.

3. In the process claimed in claim 1, the application of caustic potash in the form of a dilute solution produced by electrolysis from chloride of potassium, for the purpose of decomposing gypsum.

CAMILLE HORST.